Inventor
Jesse G. Lindeman
By Bacon & Thomas
Attorneys

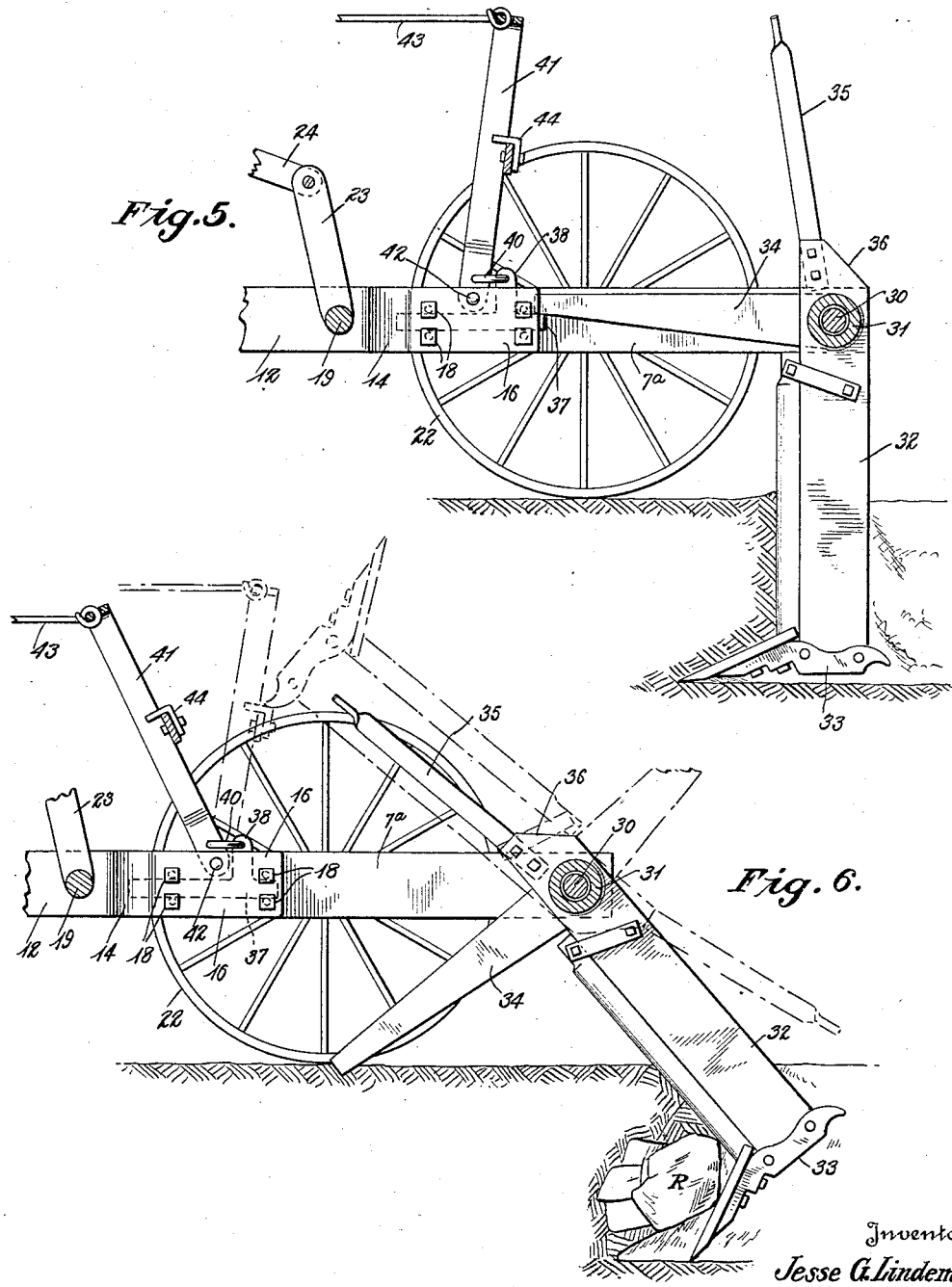

Patented Apr. 26, 1932

1,855,604

UNITED STATES PATENT OFFICE

JESSE G. LINDEMAN, OF YAKIMA, WASHINGTON

SUBSOILER

Application filed August 9, 1929. Serial No. 384,530.

This invention relates to new and useful improvements in subsoilers.

The primary object of the invention is to provide a subsoiler having a plow portion intended to penetrate into the lower soil for breaking up the same so that water and roots may get through any hard layer that is evident, the said plow portion of the device being mounted for movement to free the same from any obstructions, such as pipes or large rocks, while the subsoiler is advancing in its intended direction.

A further object of the invention is to provide a subsoiler which overcomes the necessity of backing up or vertically raising the device through the medium of jacks or the like when the plow portion encounters obstructions. With certain subsoilers, when an obstruction is encountered, it is necessary to either back the plow out of the ground or to raise the plow so that it will clear the obstruction. Some form of lifting means is usually provided which is driven by the wheels employed for supporting the frame.

A still further object of the invention is to provide a very simple form of subsoiler which possesses all of the above referred to advantages.

Other objects and advantages of the invention will be apparent during the course of the following description.

Figure 1:
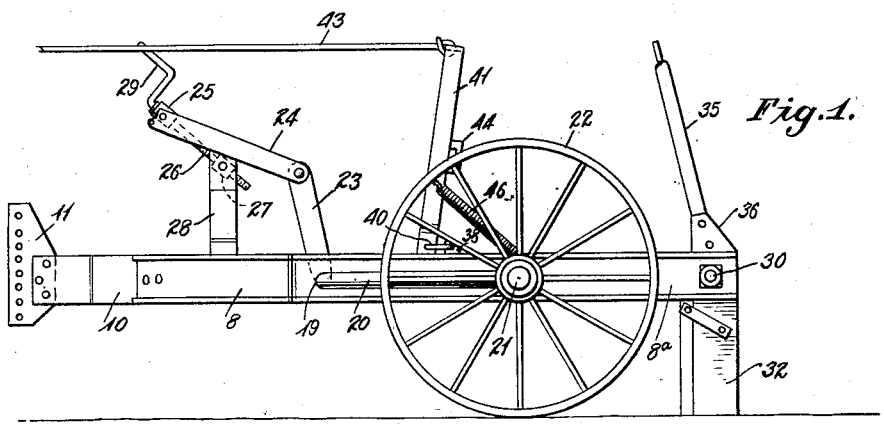
Figure 2:
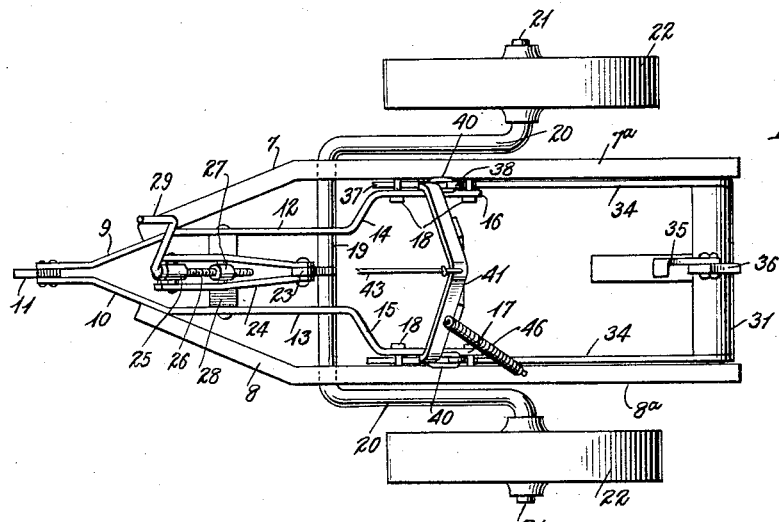
Figures 3, 4:
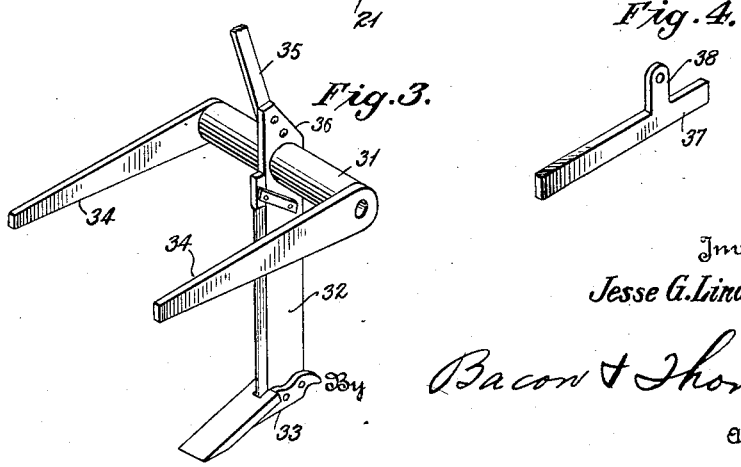

In the accompanying drawings forming a part of this specification and in which like numerals are employed to designate like parts throughout the same, Figure 1 is a side elevational view of a subsoiler embodying this invention, Figure 2 is a top plan view of the structure disclosed in Figure 1, Figures 3 and 4 are detailed perspective views of portions of the device, Fig. 5 is a longitudinal sectional view of the subsoiler and illustrates the position occupied by the plow portion of the device during the breaking up of the lower soil, and Figure 6 discloses in full lines and dot and dash lines the different positions of the plow when it encounters an obstruction and during its movement to avoid said obstruction.

Wherein for the purpose of illustration is shown a preferred embodiment of the invention, the numerals 7 and 8 designate the opposite side bars which constitute a portion of the frame of the device. The rear portions of these bars extend in parallelism with each other while the front portions converge longitudinally of the machine to be connected to the bracing bars 9 and 10. These bars 9 and 10 project beyond the converging ends of the side bars 7 and 8 for connection with a draft plate 11. The rear portions of the bars 9 and 10 are provided with parallel sections 12 and 13 having connected to the rear ends thereof the diverging sections 14 and 15 which carry the parallel sections 16 and 17. These parallel end sections 16 and 17 are connected to the parallel portions 7a and 8a of the side bars 7 and 8 by means of the four properly positioned bolts 18. The spacing of these bolts 18 is best illustrated in Figs. 5 and 6 and the function performed by the spacing of the same will be more completely disclosed at a later point. The said bolts 18 retain the rear sections 16 and 17 of the bracing bars 9 and 10 in spaced relation with respect to the adjacent portions of the side bars 7 and 8.

For the purpose of mounting the frame so that it may be vertically adjusted with respect to the surface of the ground over which the subsoiler is moving, an angular axle is connected to the frame. This axle consists of an intermediate portion 19 which passes transversely through the bars 7 and 8. Connected to the outer ends of the transverse section 19 and located beyond the sides of the bars 7 and 8 are sections 20 which have the journal portions or stub axles 21 connected to their free ends and projecting laterally of the frame. Ground engaging wheels 22 are freely mounted upon the journals or stub axle portions 21.

An arm 23 is rigidly fastened to the middle portion of the axle section 19 and projects generally upwardly to have its upper extremity pivotally connected to the pair of links 24 which in turn are pivotally connected at their outer ends to the block 25 rotatably mounted upon the adjusting screw 26. This screw has adjustably mounted thereon a block 27 pivotally mounted between the upstanding brackets 28 which are connected to the parallel portions 12 and 13 of the bracing bars 9 and 10.

It will be noted that the wheels 22 are connected to the subsoiler frame by means of an axle structure which is similar to a double throw crank formation. To adjust the elevation of the frame with respect to the soil over which the device is traveling, it only becomes necessary to throw the arm 23 forwardly or rearwardly. This movement of the arm will cause the axle to rotate with respect to the frame for swinging the rearwardly extending portions 20 either upwardly or downwardly with respect to said frame. Movement of the arm 23 may be brought about by rotating the adjusting screw 26 through the medium of its operating crank 29.

The rear ends of the side bar portions 7a and 8a have connected thereto a shaft 30. A tubular member 31 is rotatably mounted upon the shaft 30 and has connected thereto the blade-like shank 32 of the plow 33. This plow shank is connected to the tubular mounting member 31 approximately at the lengthwise center of the latter. Connected to the opposite ends of the mounting 31 are arms 34 which extend at substantially right angles to the shank 32. A single arm 35 is connected to a projection 36 of the shank 32 and extends in a direction substantially diametric to that of said shank.

In Fig. 4 there is disclosed a latch which consists of the bolt portion 37 and the upstanding apertured lug 38. One of these latch structures is provided for each side of the frame and is arranged as illustrated in Figs. 5 and 6; namely, between the portions 16—17 and 7a—8a of the frame structure. The bolts 18 support the latch structures and permit longitudinal sliding movement of the said structures. The upstanding apertured lugs 38 of the latches are connected by links 40 to the inverted substantially U-shaped operating lever 41 which is pivoted at the lower ends of its arms by means of the elements 42 to the frame bars. An operating cable, or the like, 43 is connected to the upper portion of this lever 41. An angle member 44 is connected to the side legs of the lever 41 substantially intermediate the ends of the same. This angle member 44 acts as a support for the plow in a manner to be described at a later point.

The operation of this device may be described as follows:—

Fig. 6 discloses the plow in dot and dash lines. It will be seen that the said plow is resting upon the stop or support provided by the angle member 44. By pivoting the lever 41, the support 44 will be moved from beneath the plow to permit the latter to drop downwardly by gravity into engagement with the soil. During the time that the plow is supported by the angle member 44, the arms 34 and 35 are located with respect to the soil in the manner illustrated in dot and dash lines in Fig. 6.

After the plow has been released from the angle member 44 so that it is placed in engagement with the soil, as explained above, the plow will bite into the ground sufficiently to cause it to swing until the shank 32 assumes a vertical position as shown in Fig. 5. As soon as the plow has been released from the angle member 44, the operating cable 43 for said member should be released to permit the spring 46 to return the lever 41 carrying the member 44 to the full line position illustrated in Fig. 5. The above movement of the plow from its position of inoperativeness, shown in dot and dash lines in Fig. 6, to the opposite position, shown in full lines in Fig. 5, occurs whenever the subsoiler is moved to a place where work is to be performed, or after an obstruction R has been encountered and the plow has been released and permitted to pivot through engagement with said obstruction for withdrawing the plow from the soil. This movement of the lever 41 has positioned the latch devices so that the bolts 37 will project into the paths of movement of the arms 34. These arms will engage the bolts 37 when the shank of the plow assumes a vertical position. Further swinging movement of the plow rearwardly of the frame, therefore, will be prevented by the engagement of the arms 34 with the bolts 37. During the forward travel of the subsoiler, the plow may engage an obstruction such as the group of rocks R illustrated in Fig. 6. When such obstruction is reached, the operator should pull upon the cord 43 for moving the lever 41 to shift the bolts 37 out of engagement with the arms 34. This will release these arms and further forward movement of the subsoiler will cause the plow to swing rearwardly. This movement of the plow and its shank 32 will cause the arms 34 to engage the surface of the soil and they will bite into the soil in such a manner that the plow will be lifted entirely out of the soil while the arms 34 are passing beneath the shaft 30 from which this pivoted or rotatable plow structure is mounted. By the time the arms 34 have moved into a position rearwardly of the shaft 30 and no longer bite into the soil, the arm 35 then will engage the soil. This arm 35 will function in the same manner as the arms 34 and will swing the plow over and beyond the shaft 30 so that the plow will fall by gravity until it engages the support 44. It will remain in this position until the lever 41 again is operated to release the plow.

It is to be understood that the form of this invention herewith shown and described is to be taken as a preferred example of the same, and that various changes in the shape, size and arrangement of parts may be resorted to without departing from the spirit of the invention or the scope of the subjoined claim.

Having thus described the invention, I claim:

In a soil working machine, a travelling frame, a soil working tool, means for rotatably connecting the tool to the frame to permit the tool to make a complete revolution, a bolt having an upstanding lug slidably connected to the frame for retaining the tool in a work performing position, means connected to the tool for rotating the same through a complete revolution with respect to the frame when the tool engages an obstruction while in its work performing position, an inverted U-shaped lever carrying a support pivoted on the frame for presenting the support to the tool to stop the rotary movement of the latter while out of contact with the soil, a connection between the upstanding lug of the bolt and the lever, and means connected to the lever to cause simultaneous actuation of both the bolt and the lever.

In testimony whereof I affix my signature.

JESSE G. LINDEMAN.